US00RE44083E

(19) United States
(12) Reissued Patent
Dahl et al.

(10) Patent Number: US RE44,083 E
(45) Date of Reissued Patent: Mar. 19, 2013

(54) PROTECTIVE PACKAGE FOR AN AUTOMOBILE PART

(75) Inventors: Edward Dahl, Maple Park, IL (US); Scott R. Jensen, Chicago, IL (US); Jeff A. Waterman, South Elgin, IL (US); Randy J. Wians, Hampshire, IL (US)

(73) Assignee: Batavia Container, Inc., Batavia, IL (US)

(21) Appl. No.: 12/957,891

(22) Filed: Dec. 1, 2010

Related U.S. Patent Documents

Reissue of:
(64) Patent No.: 7,458,465
Issued: Dec. 2, 2008
Appl. No.: 11/217,902
Filed: Sep. 1, 2005

(51) Int. Cl.
*B65D 85/30* (2006.01)

(52) U.S. Cl. ..... 206/592; 206/521; 206/586; 206/587

(58) Field of Classification Search ..... 206/335, 206/448, 453, 454, 583, 586, 590, 591, 592, 206/449, 521, 756, 587, 485, 594, 319; 248/345.1
See application file for complete search history.

(56) References Cited

U.S. PATENT DOCUMENTS

| | | | | |
|---|---|---|---|---|
| 1,708,291 | A | | 4/1929 | Bliss |
| 1,751,782 | A | | 3/1930 | Wells |
| 1,956,687 | A | | 5/1934 | Kratz |
| 2,160,816 | A | | 6/1939 | Barnes |
| 2,734,626 | A | | 2/1956 | Koester et al. |
| 2,769,534 | A | * | 11/1956 | Lidgard ..... 206/448 |
| 2,953,253 | A | * | 9/1960 | Henderson et al. ..... 211/41.14 |
| 3,043,488 | A | | 7/1962 | Warwick |
| 3,389,785 | A | | 6/1968 | Lidgard |
| 3,389,786 | A | | 6/1968 | Lidgard |
| 3,414,124 | A | | 12/1968 | Lidgard |
| 3,780,933 | A | | 12/1973 | Freeman |
| 3,884,356 | A | | 5/1975 | Lidgard |
| 3,896,932 | A | | 7/1975 | Giebel et al. |
| 3,921,890 | A | | 11/1975 | Reihm |
| 4,182,450 | A | * | 1/1980 | Kryger ..... 206/448 |
| 4,225,043 | A | * | 9/1980 | Lastik ..... 206/448 |
| 4,972,954 | A | | 11/1990 | Dickie |
| 5,101,976 | A | * | 4/1992 | Salisbury ..... 206/454 |
| 5,141,108 | A | | 8/1992 | Roccaforte |
| 5,178,279 | A | | 1/1993 | Carroll |
| 5,328,033 | A | | 7/1994 | Ptaschinski |
| 5,398,808 | A | | 3/1995 | Chen et al. |
| 5,413,216 | A | | 5/1995 | Timmins |
| 5,729,960 | A | | 3/1998 | Davis |
| 5,772,025 | A | | 6/1998 | Chen et al. |
| 6,092,651 | A | | 7/2000 | Miller |
| 6,268,039 | B1 | | 7/2001 | Chou et al. |
| 6,527,120 | B2 | | 3/2003 | Okamoto |
| 6,622,860 | B2 | | 9/2003 | Horbal |
| 6,675,969 | B1 | | 1/2004 | Kiyohara et al. |

(Continued)

*Primary Examiner* — Steven A. Reynolds
(74) *Attorney, Agent, or Firm* — Chicago IP Law; Steven M. Evans

(57) ABSTRACT

A protective package for an automobile part; as assembled, packaged and buttressed for shipping; minimizes or eliminates damage to the automobile part being shipped, by providing a carton, side rail supports in the carton to receive the part and padded supports to secure the part in the carton.

28 Claims, 14 Drawing Sheets

U.S. PATENT DOCUMENTS

| | | | | |
|---|---|---|---|---|
| 6,679,378 | B1 | 1/2004 | Vermeulen et al. | |
| 6,752,271 | B2 | 6/2004 | Allison | |
| 6,843,374 | B1 | 1/2005 | Li et al. | |
| 7,419,055 | B2 | 9/2008 | Manuel | |
| 2003/0019779 | A1* | 1/2003 | Horbal | 206/521 |
| 2004/0016663 | A1 | 1/2004 | Allison | |
| 2004/0129589 | A1 | 7/2004 | Tucker et al. | |
| 2005/0155890 | A1* | 7/2005 | Manuel | 206/523 |

* cited by examiner

PROTECTIVE PACKAGE FOR AN AUTOMOBILE PART

Matter enclosed in heavy brackets [ ] appears in the original patent but forms no part of this reissue specification; matter printed in italics indicates the additions made by reissue.

This invention relates to a protective package, especially for an automobile part, and more particularly, to a protective package for an automobile part, especially a hood, which complies with shipping standards and permits efficient shipping of the part.

BACKGROUND OF THE INVENTION

When a vehicle accident occurs, it is usually necessary to replace various parts of the vehicle. These parts of the vehicle are body parts, frame parts, mechanical parts, or electrical parts. With the body part, one major problem involves appropriate storage of body parts, until the particular use is desired.

Because vehicle body parts are generally large and require a substantial amount of storage space, it is usually desirable to warehouse the body parts, and ship the body parts to the desired location. The desired location is usually a body shop that actually makes the vehicle repairs.

Since warehouse space can be expensive, it is desired to reduce the number of warehouses and provide a shipping program to efficiently transport the desired part to the desired location. With such transportation, an effective package for the part permits shipping of the part with no damage. Because not all body parts are heavily supported or braced, it is difficult to ship parts.

Major keys to efficient use of warehouse space are proper storage and utility of the packaging materials. Not only must the packaging material be easily stored, it must also be easily assembled into the desired package. Such a combination provides value and efficiency to the packaging material.

One of the most difficult parts to ship is a vehicle hood or cover for the engine compartment. Some aftermarket suppliers have stopped shipping vehicle hoods because of the difficulty and expense of getting the hoods, to a desired location in an undamaged condition.

More particularly, it is known that is very difficult to ship a hood for a Mercedes. In spite of substantial efforts to correct the package and greatly reduce the damage to any part contained in the package, the efforts have met with no success. In fact, more than twenty-five (25%) percent of these shipped hoods are known to arrive in a damaged condition.

This damage problem imposes many undesirable limits. One such limit is the distance a hood may be shipped. To solve that problem, more warehouses for parts or better shipping packages are required. Such difficulties also lead a lack of flexibility in type or size of a hood that can be packed and shipped. Furthermore, it is difficult to develop a package acceptable to the commercial delivery services. If the package containing the auto parts or the hood or other body part can meet the standards of a commercial shipping organization, such as Federal Express or United Parcel Service, great advantages can be obtained. Such advantages include, but are not limited to, damage insurance on the part being shipped.

SUMMARY OF THE INVENTION

Among the many objectives of this invention is the provision of a protective package, which permits an automobile part to be shipped in an efficient fashion.

A further objective of this invention is the provision of a protective package, which prevents damage to an automobile part shipped therein.

Yet a further objective of this invention is the provision of a protective package, which meets industry standards for shipping.

A still further objective of this invention is the provision of a protective package, which is easily installed around an automobile part.

Another objective of this invention is the provision of a protective package, which is easily stored.

Still, another objective of this invention is the provision of a protective package, which is easily assembled.

Also, an objective of this invention is the provision of a protective package, which has repeated uses.

A further objective of this invention is the provision of a protective package, which increases the distance an automobile part may be safely shipped.

Yet a further objective of this invention is the provision of a protective package, which has flexibility to safely many different products.

These and other objectives of the invention (which other objectives become clear by consideration of the specification, claims and drawings as a whole) are met by providing a protective package for an automobile part, which can be assembled, packaged and buttressed for shipping, in order to minimize or eliminate damage to the automobile part being shipped, by providing a carton, side rail supports in the carton to receive the part and padded supports to secure the part in the carton.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

In accordance with the present invention, a protective package for a part to be shipped has a slotted side rail placed on either side of the part. The two side rails containing or supporting the part are inserted into a carton. Some buttressing members are inserted into the slots. Other buttressing members are positioned between each slotted side rail and a side of the carton to further support the part, considering that the part is not perfectly rectangular.

This particular package meets the standards set by Federal Express and solves that company's concern over high damage incidence rates. Furthermore, the protective package meets and exceeds International Safe Transit Association ISTA (hereafter ISTA) standards for testing by being drop tested from 30 inches to a hard surface, which is in excess of the normal 12 inch drop test, and still provides adequate protection. Such a protective package solves the problems of damage to the hood, shipping distance limitations, flexibility in type or size of hood that can be packed. The aftermarket automobile repair industry is interested in this pack due to its flexibility and wide application.

Figure 1:
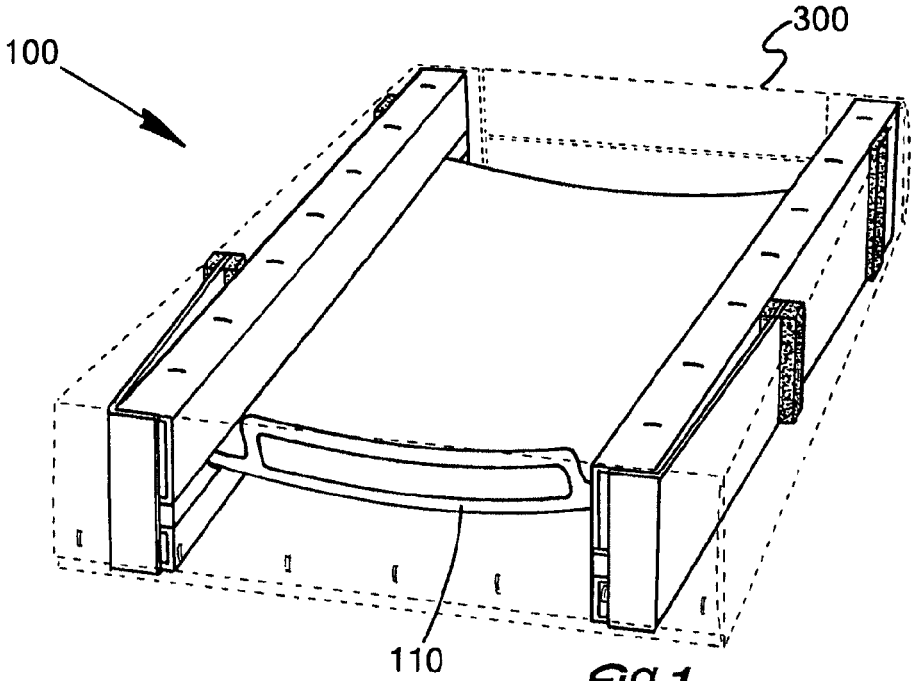
FIG. 1 depicts a see through perspective view of a package assembly 100 of this invention for a vehicle hood 110, in a sealed shipping carton 300 shown in phantom.
Figure 2:
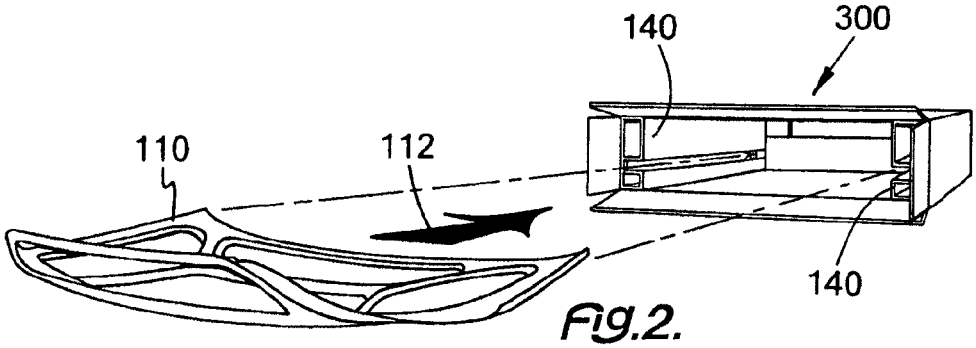
FIG. 2 depicts a perspective view of an inward direction 112 of hood 110.

Referring now to FIG. 1 and FIG. 2, a package assembly 100 contains a vehicle hood 110, using a hood packing assembly 120 in a sealed shipping carton 300. Sealed shipping carton 300 is known in the packaging industry as a regular slotted carton (hereafter RSC). The inward direction 112 places hood 110 in the hood packing assembly 120.

Figure 3:
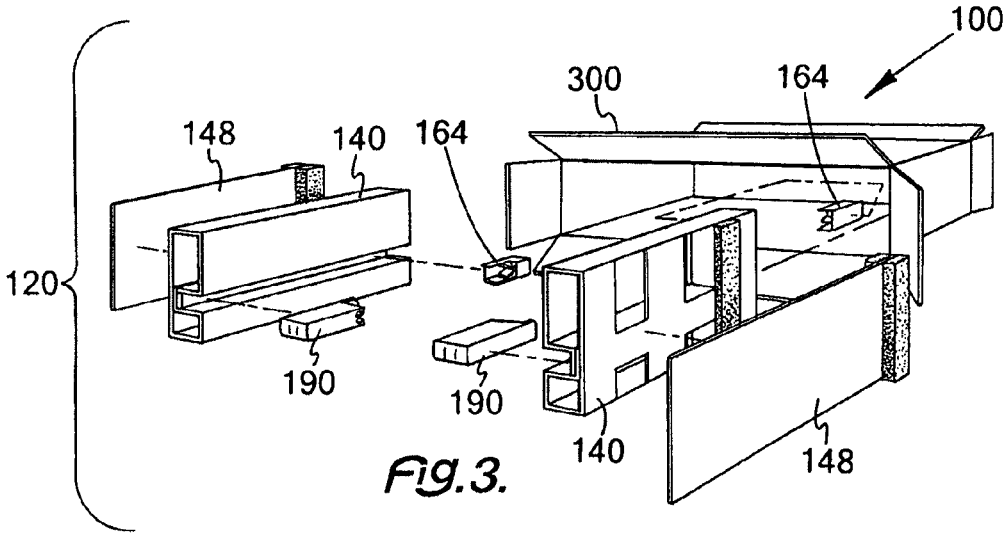
FIG. 3 depicts a perspective, exploded, related view of all components for package assembly 100.

Adding FIG. 3 to the consideration, all components of hood packing assembly 120 and sealed shipping carton 300 are shown in relationship to each other. Shipping carton 300 receives or has a side rail 140 on either side of hood 110. In each side rail 140 are mounted a corrugated rear insert 164 and a corrugated front insert 190. Oppositely disposed from the inserts and between the shipping carton 300 and both of side rails 140 are medium spacer pads 148, in order to further support hood 110.

Figure 4:
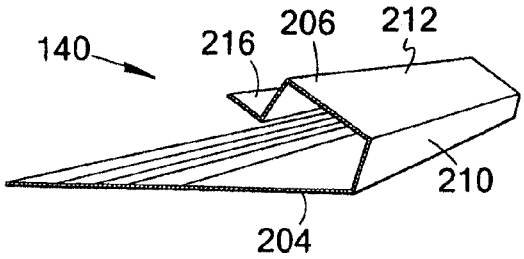
FIG. 4 depicts a perspective view of a side rail 140 being partially folded to form part of package assembly 100.
Figure 5:
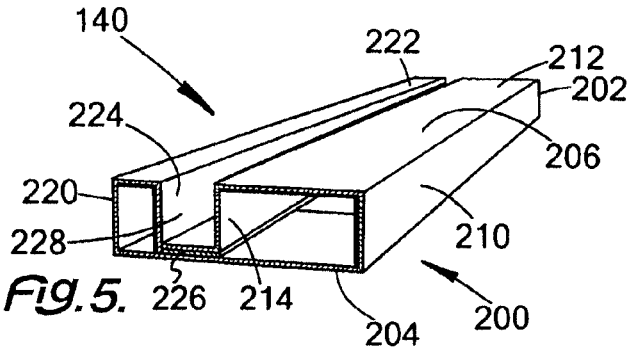
FIG. 5 depicts a perspective view of a side rail 140 being completely folded to form part of package assembly 100.

With FIG. 4 and FIG. 5, the formation of side rail 140 is depicted as starting with a scored flat corrugated piece of material being folded to form side rail 140. More particularly, side rail 140 has an outer side 204 and inner side 206. Outer side 204 is spaced from each end of the flat corrugated piece of material. At one side of outer side 204 is large top panel 210. Large top panel 210 extends into larger inner panel 212, which forms part of inner side 206 and is preferably substantially parallel to outer side 204. Larger inner panel 212 extends into first slot side 214 and then into second base side 216.

Likewise, small bottom panel 220 extends from outer side 204 and is substantially perpendicular thereto. Small bottom panel 220 then forms smaller inner panel 222. Smaller inner panel 222 extends into second slot side 224 and then, in turn, to the first slot base 226. Rail channel slot 228 thus formed receives hood 110 in a proper fashion because slot 228, in this case, is not centered on inner side 206.

Thus, there are two side rails 140 which are folded in mirror fashion, and placed in shipping carton 300 (FIG. 2). These two side rails 140 have rail channel slots 228 on their inner sides 202 facing one another, and an outer side 204 facing the shipping carton 300.

Figure 6:
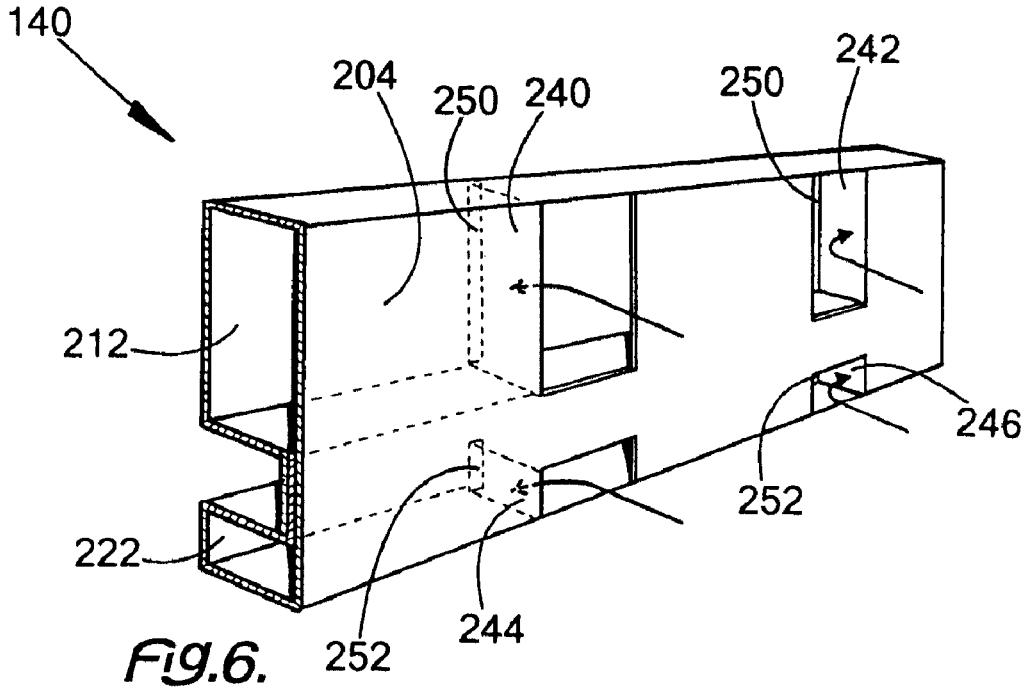
FIG. 6 depicts a perspective view of a side rail 140 using swing brace panels to add strength, form and rigidity to side rail 140.
Figure 7:
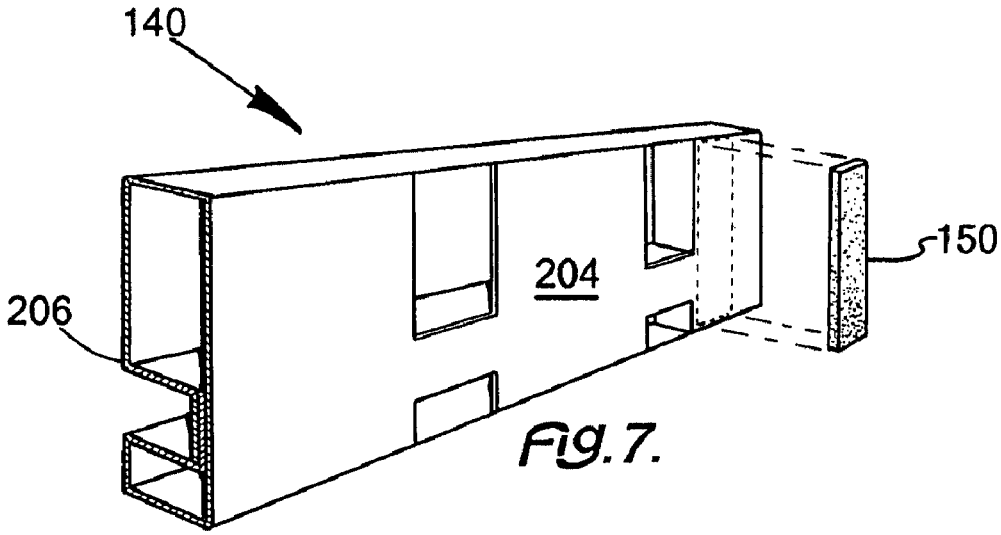
FIG. 7 depicts a perspective view of the outer side 204 of side rail 140 with a side foam spacer 150 being attached thereto.

With FIG. 6 and FIG. 7, the reinforcement of side rail 140 is clarified. Adjacent to larger inner panel 212 in outer side 204 is a large top swing brace panel 240 and a smaller top swing brace panel 242 that swing and away from each other. Both top panels 240 and 242 have an upper rest lip 250, which contacts and rests against inner panel 212. At the lower portion of outer side 204 are larger bottom swing brace 244 and smaller bottom swing brace panel 246, both of which swing in, but away from each other. Both of swing brace panels 244 and 246 have a rest lip 252, which contacts and rests against inner panel 222. Both sets of swing brace panels offer increased rigidity and strength without increasing the overall weight of the package So from outer side 204 of side rail 140 as the swing brace panels are set, the structure adds strength, form and rigidity to the side rail 140 and hence to the hood packing assembly 120. For further support, a side foam spacer 150 may be added at or adjacent to one end of the outer side 204. The side foam spacer 150 is in fact preferred to be so located.

Figure 8:
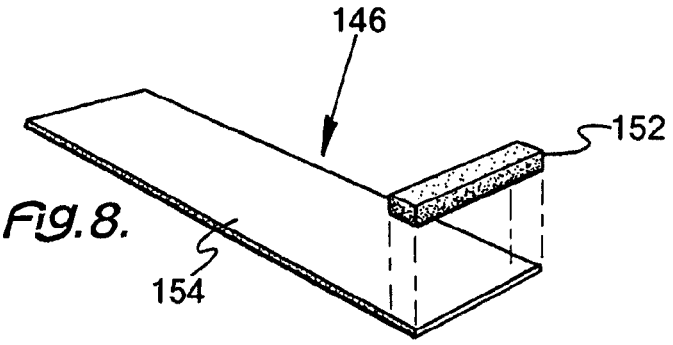
FIG. 8 depicts a perspective view of thin spacer pad 146 used in package assembly 100.
Figure 9:
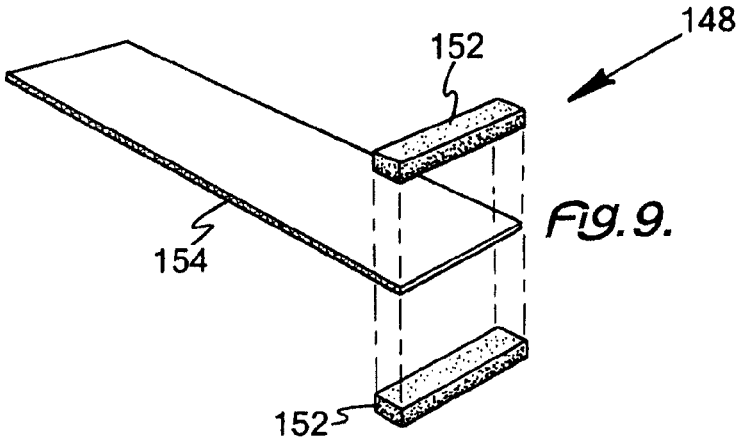
FIG. 9 depicts a perspective view of medium spacer pad 148 used in package assembly 100.
Figure 10:
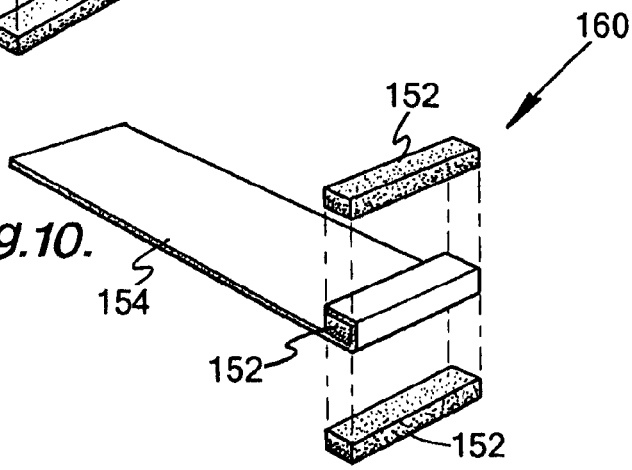
FIG. 10 depicts a perspective view of thick spacer pad 160 used in package assembly 100.
Figure 11:
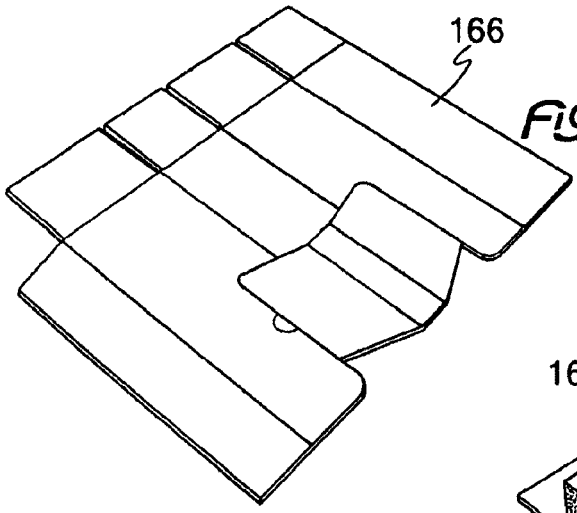
FIG. 11 depicts a perspective view of corrugated rear insert 164 in a die-cut flat position 166.
Figure 12:
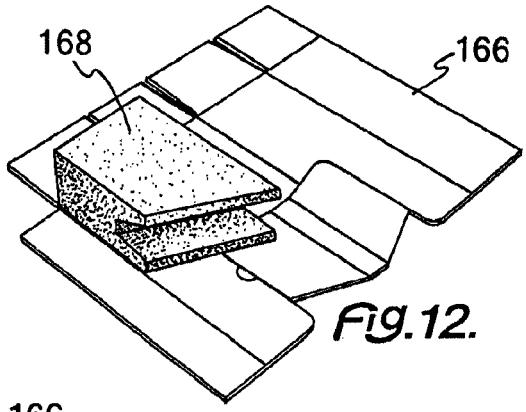
FIG. 12 depicts a perspective view of rear foam 168 lying on corrugated die cut flat 166 for rear insert 164.
Figure 13:
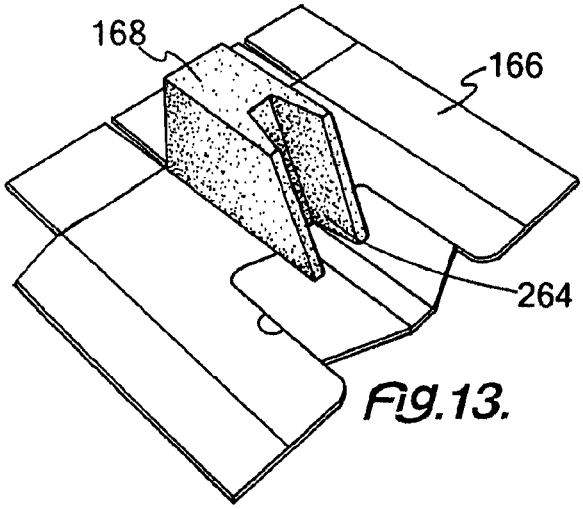
FIG. 13 depicts a perspective view of rear foam 168 lying on corrugated die cut flat 166 for rear insert 164.
Figure 14:
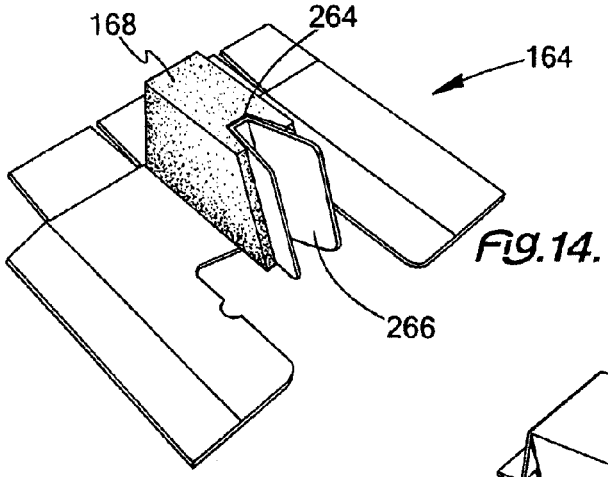
FIG. 14 depicts a perspective view of rear foam 168 set in rear insert 164 partially folded and wrapped.
Figure 35:
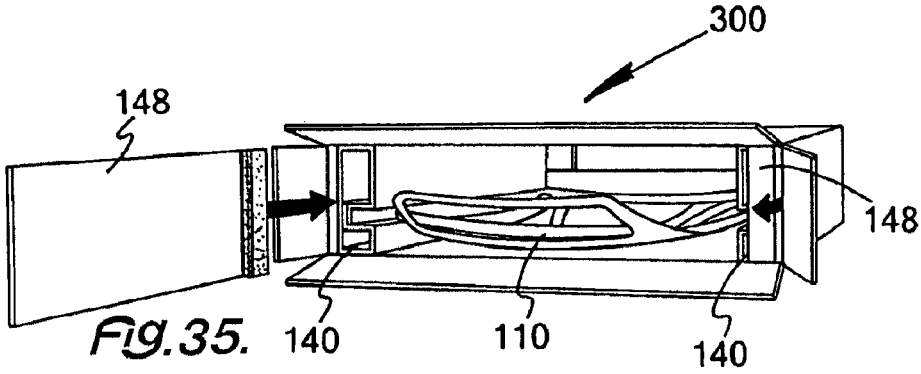
FIG. 35 depicts a perspective view of shipping carton 300 having two of side rail 140 inserted therein with medium spacer pads 148 exploded therefrom, based on FIG. 34.

FIG. 8, FIG. 9 and FIG. 10 combine to illustrate some of the variety of spacer pads which are used between the shipping carton 300 and the hood packing assembly 120. More particularly, thin spacer pad 146 uses one pad block 152 on spacer support 154, while medium spacer pad 148 has aligned pad blocks 152 on either side of spacer support 154. Spacer support 154 is preferably a corrugated sheet with a size capable of fitting between shipping carton 300 and outer side 144 (FIG. 35). Thick spacer pad 160 uses three of pad block 152 by wrapping the end of spacer support 154 around one pad block 152 and stacking the two other pad blocks 152 over and under the first with spacer support 154 therebetween.

Additionally, hood 110 or other part is supported by corrugated rear insert 164 as shown in FIG. 11, FIG. 12, FIG. 13, FIG. 14, FIG. 15, FIG. 16 and FIG. 17. The rear die-cut flat 166 is folded to form corrugated rear insert 164 and receive larger jaw angle cut spacer 262 therein. Larger jaw angle cut foam spacer 168 has larger hood slot 264 in the end thereof.

With both the front insert 190 and corrugated front insert 190, the folding is preferably done first. Then the desired foam insert is fit therein. Finally, the corrugated rear insert 164 and corrugated front insert 190.

Figure 15:
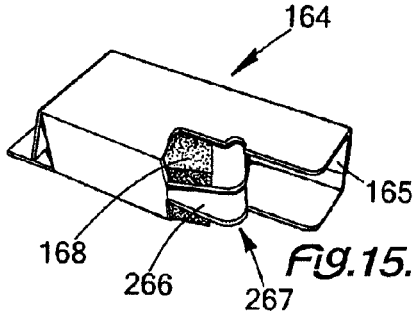
FIG. 15 depicts a perspective view of rear foam 168 set in rear insert 164 completely folded and wrapped.
Figure 16:
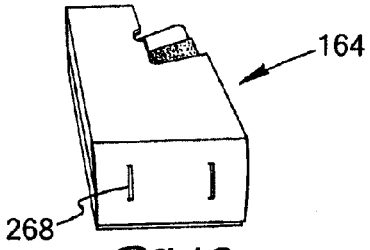
FIG. 16 depicts a perspective view of rear foam 168 set in rear insert 164 completely folded, wrapped and secured.
Figure 17:
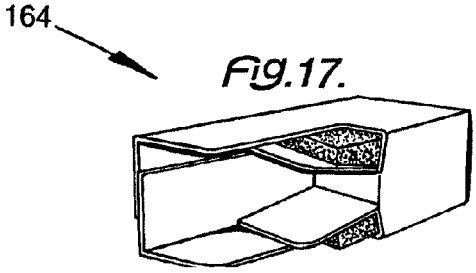
FIG. 17 depicts a perspective view of rear insert 164 as assembled.

The rear die-cut flat 260 has a foldable tongue 266 in one side thereof, which fits into larger hood slot 264. The folding process for rear die-cut flat 166 at least partially encases larger jaw angle cut foam spacer 168 therein as shown in FIG. 15. Staples 268 can secure the larger jaw angle cut spacer 168 therein. A corrugated rear insert 164 is present in both of rail channel slot 228.

Figure 18:
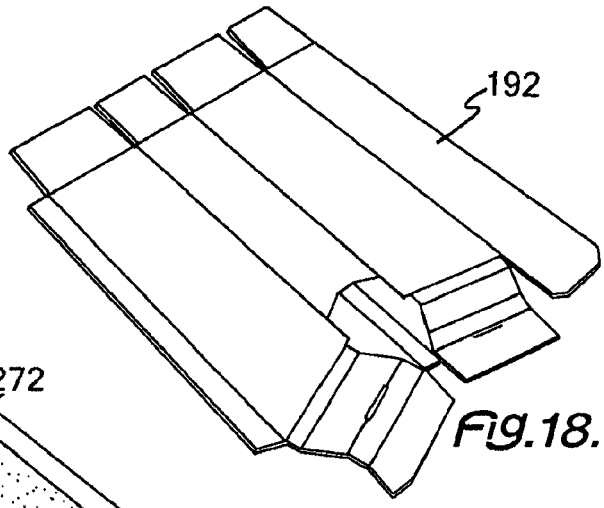
FIG. 18 depicts a perspective view of corrugated die cut flat 192 of front insert 190.

Furthermore, hood 110 or other part is also supported by corrugated front insert 190 as shown in FIG. 18, FIG. 19, FIG. 20, FIG. 21, FIG. 22 and FIG. 23. In FIG. 18 the corrugated front insert die-cut flat 192 receives front foam support 272 in the form of rectangular solid with front jaw slot 274.

Front insert die-cut flat 192 is formed into a front box 276 to receive front foam support 272 and have inner jaw cover 278 secured thereover. Then outer jaw cover 280 is secured over inner jaw cover 278. The front foam support 272 is then inserted adjacent to hood 110 in each rail channel slot 228. Front foam support 272 is preferred because of its shock absorption qualities, but other supports may be used.

Figure 19:
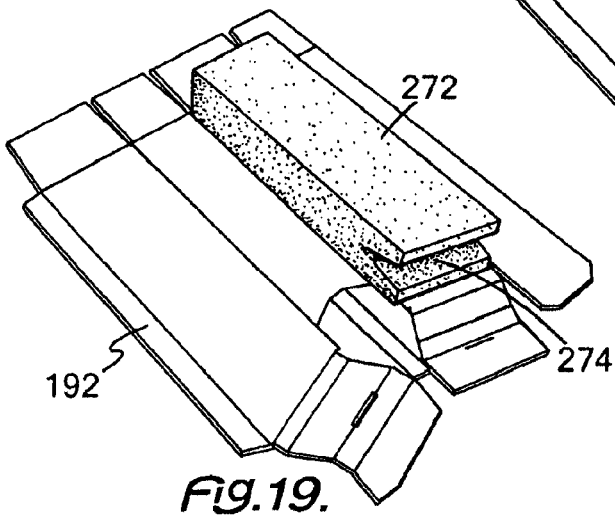
FIG. 19 depicts a perspective view of front foam 194 on corrugated die cut flat 192 of front insert 190.
Figure 20:
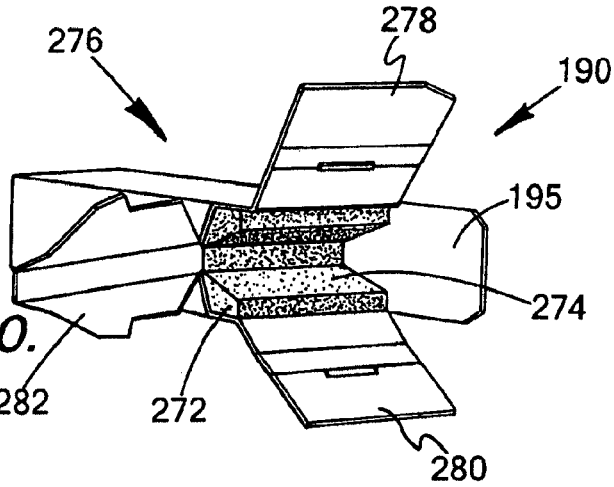
FIG. 20 depicts a perspective view of corrugated front insert 190, in partially folded position 196 with front foam insert 194 positioned thereon.
Figure 21:
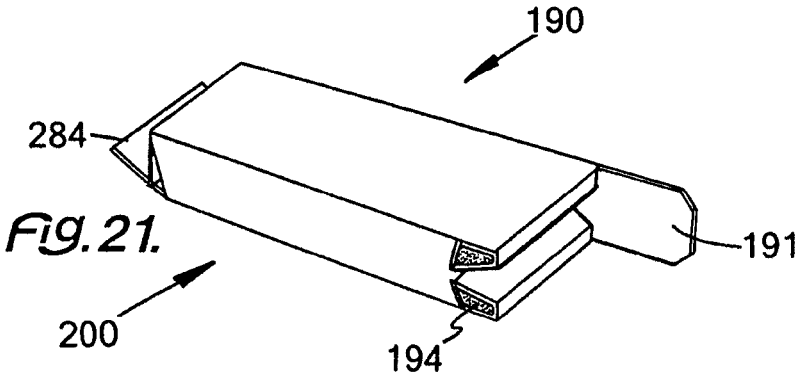
FIG. 21 depicts a front perspective view of corrugated front insert 190, in completely folded position 200 with front foam insert 194 positioned therein.
Figure 22:
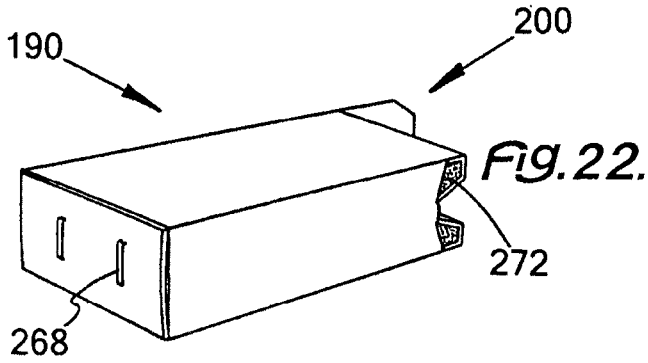
FIG. 22 depicts a rear perspective view of corrugated front insert 190, in completely folded position 200 with front foam insert 194 secured therein.
Figure 23:
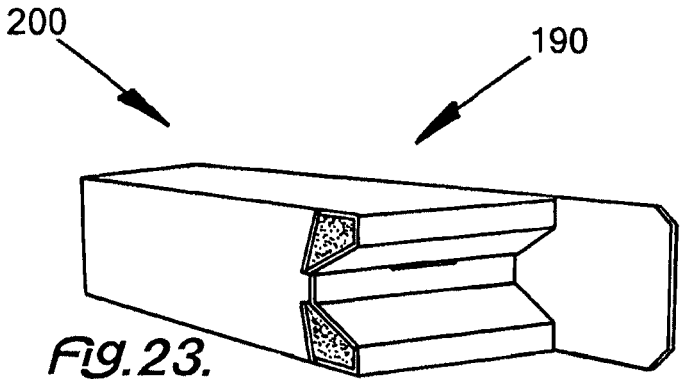
FIG. 23 depicts a front perspective view of corrugated front insert 190, in completely folded position 200 with front foam insert 194 positioned therein, based on a 180 degrees of rotation for FIG. 22 about a vertical axis.
Figure 24:
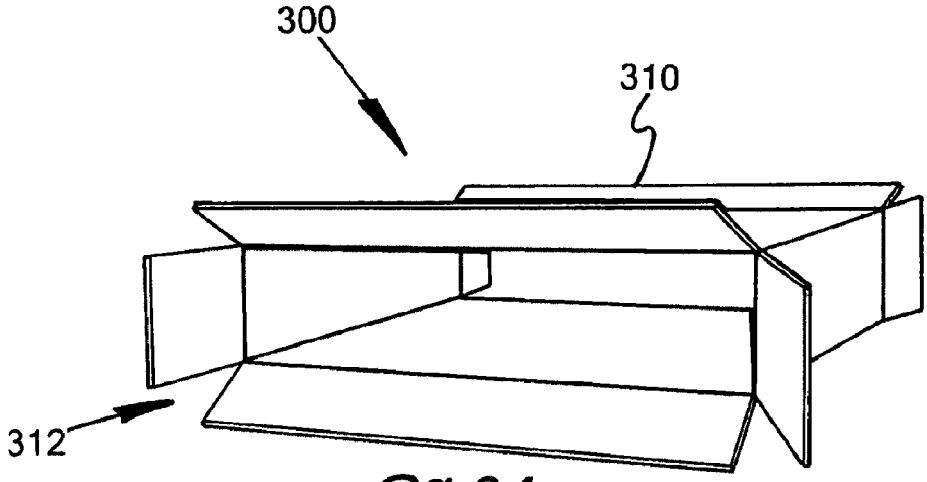
FIG. 24 depicts a perspective view of shipping carton 300.
Figure 25:
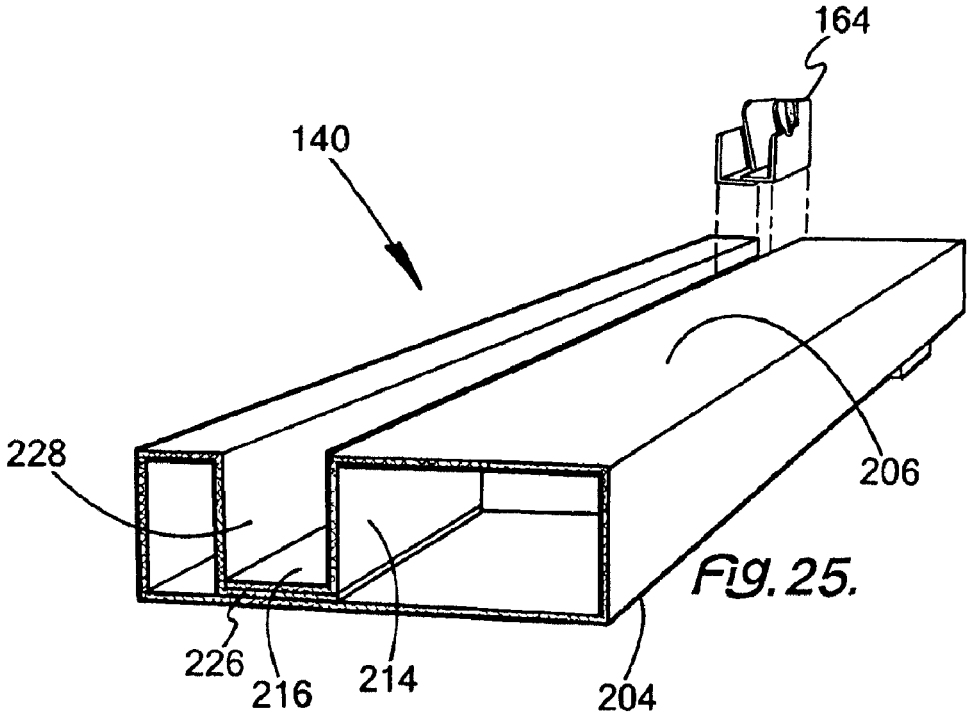
FIG. 25 depicts a perspective view of rear insert 164 inserted in side rail 140.

FIG. 19 shows front foam support 272 laying on corrugated front insert die-cut flat 192. FIG. 20 shows front foam support 272 wrapped in front insert die-cut flat 270. For front jaw slot 274, the sequence of front insert die-cut flat 192 folding is first the folding of front insert tongue 282 under both inner jaw cover 278 and outer jaw cover 280. FIG. 23 secures front insert back flaps 284 with staples 268.

Corrugated front insert 190 (FIG. 18) with front foam insert 194 can be used in place of rear die-cut flat 260 (FIG. 11) with rear insert foam 168. The opposite is also true. In this manner, all four inserts may be the same. If there is extra space in channel slot 228, it can be filled in any desirable manner. A foam piece (not shown) may be cut to fit. A corrugated piece may be rolled and cut to fit.

By considering FIG. 24, FIG. 25, FIG. 26, FIG. 27, FIG. 28, FIG. 29 and FIG. 30, one may see the relationship of the shipping carton 300 and the hood packing assembly 120 in support of hood 110. Shipping carton 300 is formed into a hollow, three-dimensional rectangle with a rear closable end 308 oppositely disposed from a front closable end 312. Two of side rail 140 are inserted in the shipping carton 300 oppositely disposed from each other and substantially perpendicular to both rear closable end 308 and front closable end 312. Rail channel slot 228 in each of side rail 140 face each other within shipping carton 300, and space hood 110 or other auto part a desired safe distance away from shipping carton 300.

Figure 26:
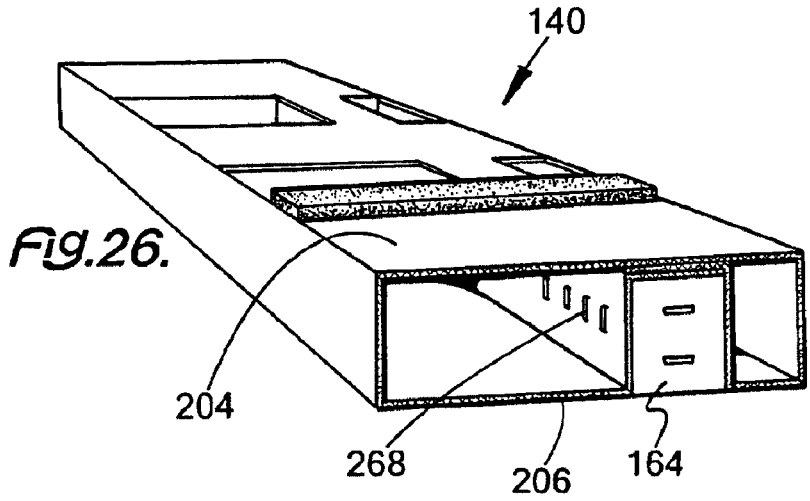
FIG. 26 depicts a perspective view of rear foam insert 168 secured in side rail 140.

In FIG. 26, corrugated rear insert 164 is secured to side rail 140 with staples 268 through rear insert tongue 290 into second base side 216. In this fashion, proper positioning is obtained for the corrugated rear insert 164.

Figure 27:
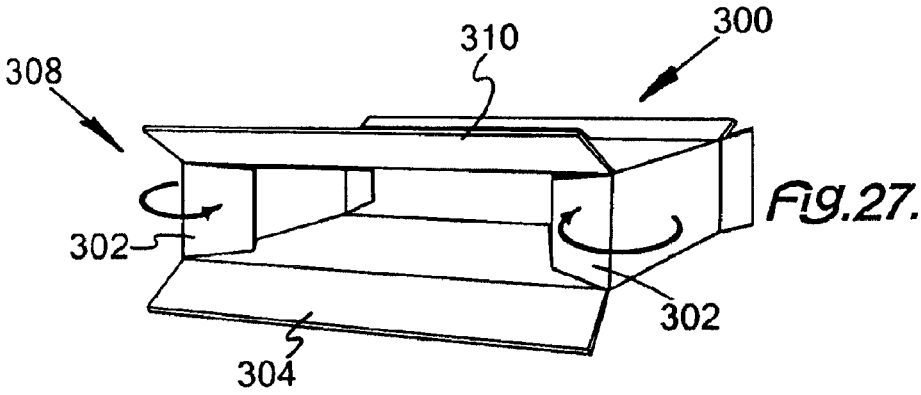
FIG. 27 depicts dust flaps 302 of shipping carton 300 used to hold a proper shape for shipping carton 300.
Figure 28:
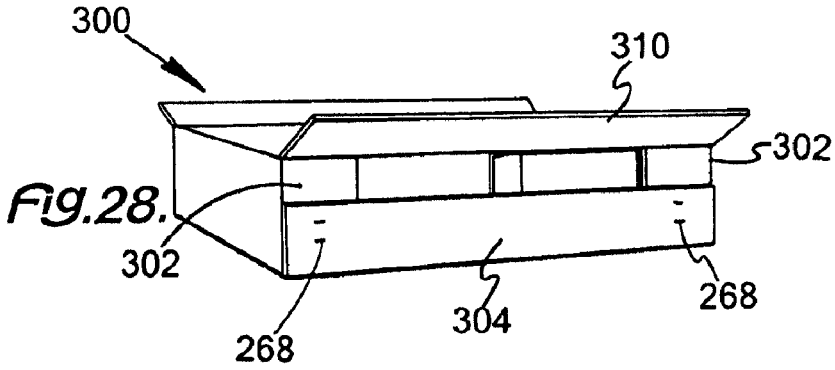
FIG. 28 depicts shipping carton 300 with rear bottom flap 304 at least partially secured.
Figure 29:
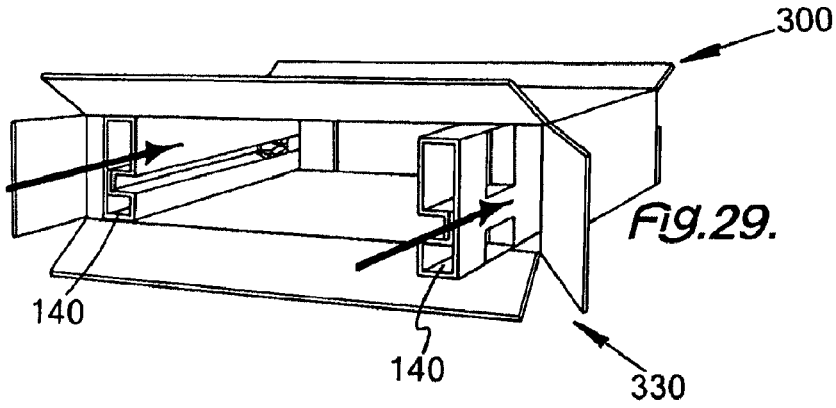
FIG. 29 depicts a perspective view of shipping carton 300 having two of side rail 140 inserted therein, one on the left side and one on the right side.

Now FIG. 27 shows the ease of assembly for shipping carton 300. Rear dust flaps 302 of shipping carton 300 are folded inwardly in order to hold shipping carton 300 in proper shape. Then using FIG. 28, rear bottom flap 304 may be secured with staples 268 to rear dust flaps 302. While rear bottom flap 304 is secured to dust flaps 302, rear top flap 310 is left free to assist with packing until shipment or storage is desired.

Figure 30:
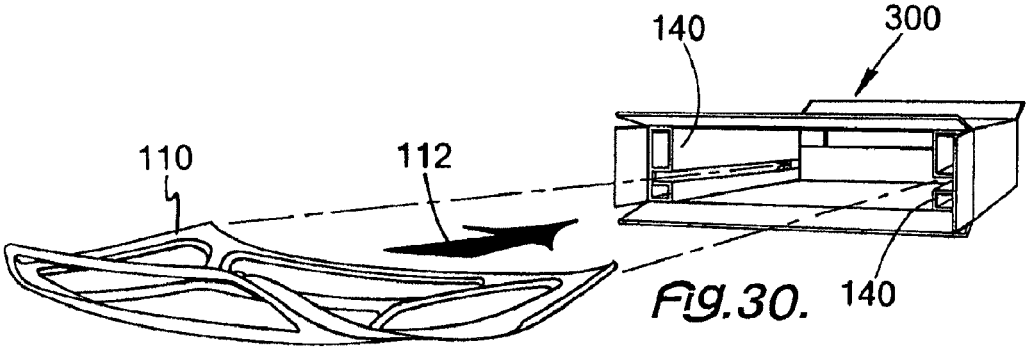
FIG. 30 depicts package assembly 100 of this invention receiving vehicle hood 110.

After the shipping carton 300 is partially assembled as discussed above, FIG. 29 shows the insertion two of side rail 140 therein on both the left and right side. Then, as shown in FIG. 30, hood 110 is properly directed into shipping carton 300.

Figure 31:
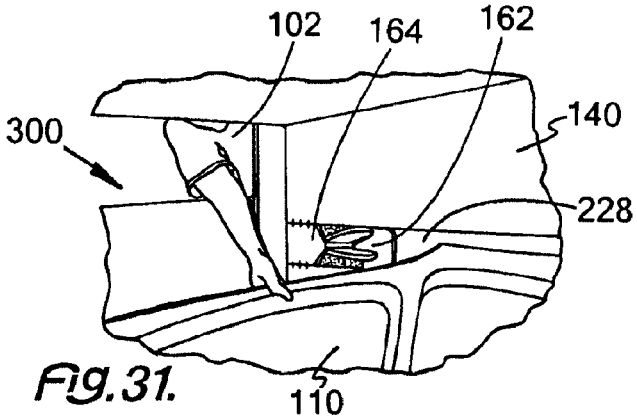
FIG. 31 depicts a person 102 reaching over rear bottom flap 304 into shipping carton 300 to grab hood 110.
Figure 32:
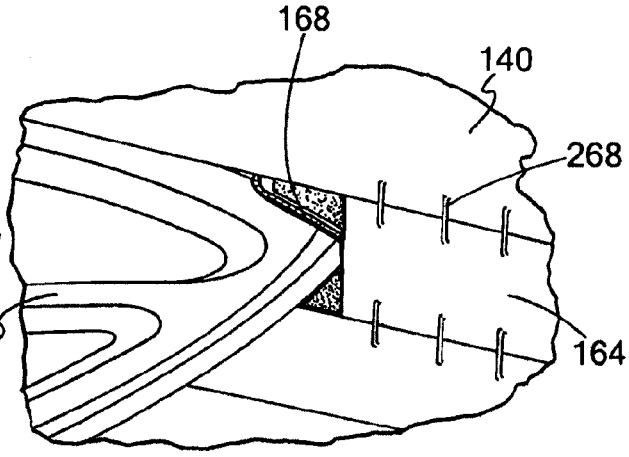
FIG. 32 depicts car hood 110 securely held in the corrugated rear insert 164.
Figure 33:
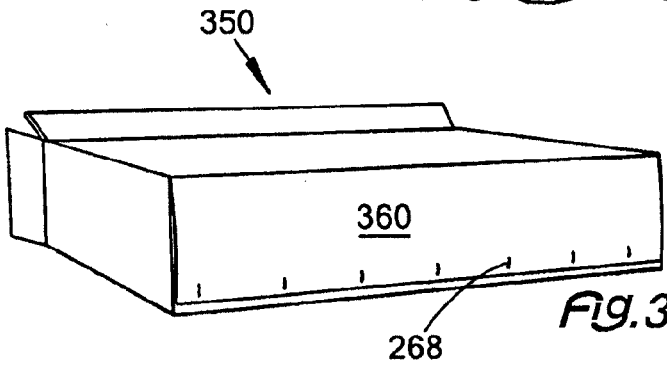
FIG. 33 depicts the closing and securing of the rear top flap 310 on the fold over carton 350.

With rear top flap 310 left open, FIG. 31 can illustrate a person 102 reaching into the rear of shipping carton 300 pulling hood 110 back to rest in rear insert jaw 162 of corrugated rear insert 164. A corrugated rear insert 164 is secured in both of side rails 140, as shown in FIG. 32. Both of corrugated rear insert 164 are adjacent to rear bottom flap 304 and within rail channel slot 228 (FIG. 31). Then as shown in FIG. 33 rear top flap 310 on fold over carton 350 is secured with staples 268, thereby causing the securing of fold over carton 350 with rear full flap assembly 360.

Figure 34:
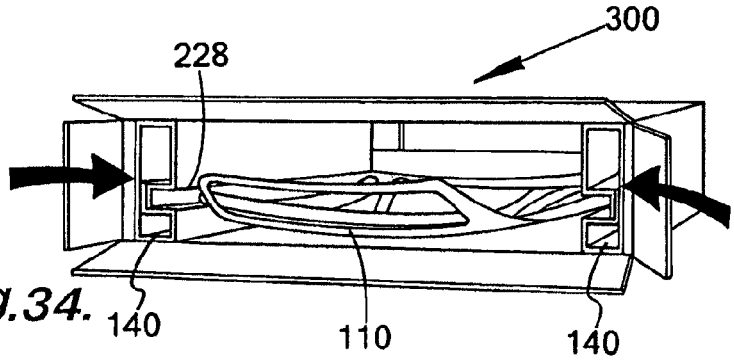
FIG. 34 depicts a perspective view of shipping carton 300 having two of side rail 140 inserted therein.

Turning now to FIG. 34 and FIG. 35, side rails 140 are pushed in toward each other evenly in order to securely snug and anchor the vehicle hood 110 in place. Then thin spacer pad 146 (FIG. 8), medium spacer pad 148 (FIG. 9), or thick spacer pad 160 (FIG. 10) may be inserted as in FIG. 35 on both the right and left side of the shipping carton 300. The appropriate spacer pad is placed between the side rail 140 and the shipping carton 300 on both the right and left side of hood 110. Each spacer pad is pushed back along side rail 140 to take up the open space there. Any remaining length that may stick out beyond the side rail 140 can be folded over the front of the side rail 140.

Figure 36:
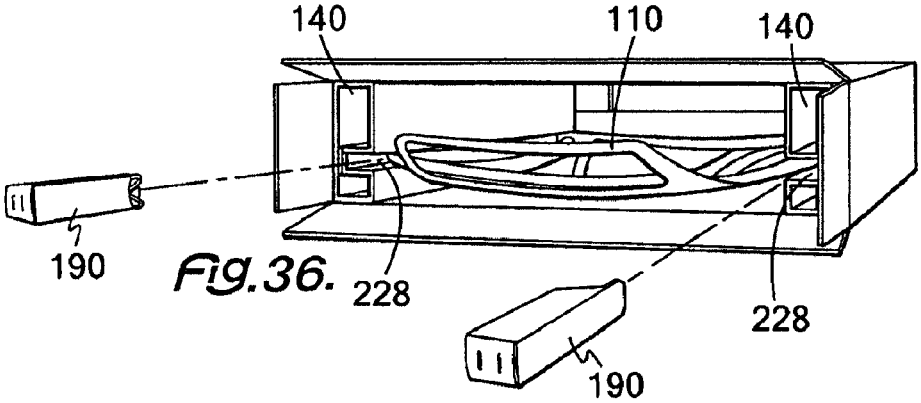
FIG. 36 depicts a perspective view of shipping carton 300 having two of side rail 140 inserted therein with corrugated front insert 190 being exploded therefrom.
Figure 37:
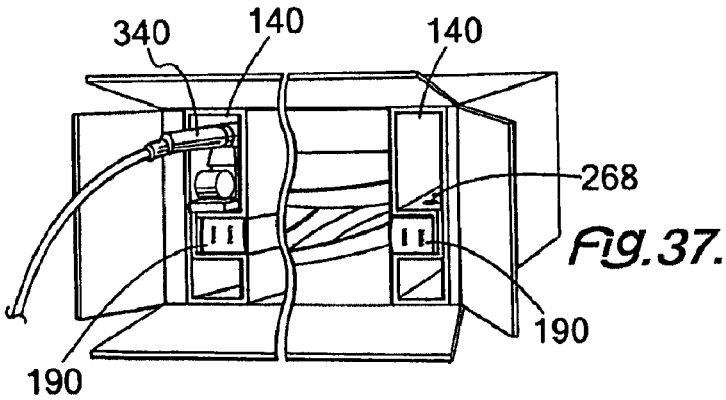
FIG. 37 depicts shipping carton 300 having both of the two side rails 140 inserted therein and with corrugated front insert 190 being secured therein.

Now in FIG. 36 and FIG. 37, a corrugated front insert 190 may be inserted into rail channel slot 228 of FIG. 34 and around hood 110. Then the corrugated front insert 190 is, as shown in FIG. 35, is secured to side rail 140 by staples 268 from stapler 340 or other fastening device.

Figure 38:
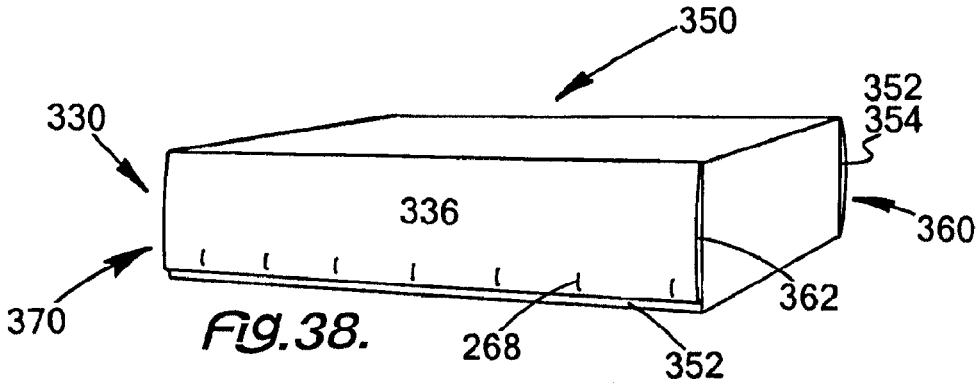
FIG. 38 depicts closing and securing of the front flap assembly 330 of fold over carton 350.
Figure 39:
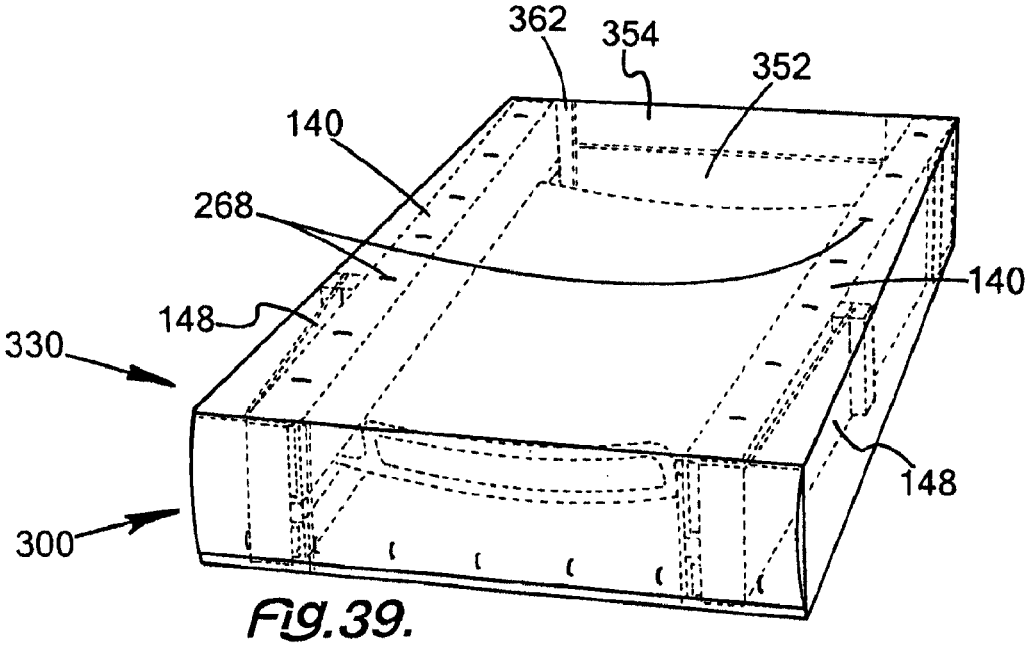
FIG. 39 depicts securing side rails 140 to the fold over carton 350.

The final package completion for package assembly 100 as depicted in FIG. 38 and FIG. 39 shows fold over carton 350. Fold over carton 350 is known in the industry as a Full Overlap carton (hereafter FOL).

Full rear bottom flap 352, at least, almost completely, if not fully, covers the rear of fold over carton 350. Fold over carton 350 is used to ship smaller implements, such as a smaller hood 110. Full rear top flap 354 folds over full rear bottom flap 352 and closes rear full flap assembly 360, because the end rear dust flaps 362 over each side rail 140 before either flap 352 or 354 is used. Then, full rear bottom flap 352 is raised and full top rear flap 354 is lowered thereover. Front full flap assembly 370 is closed in same way as rear full flap assembly 360.

Staples 268 secure the full front flap assembly 330 in a closed position. Also, staples 268 secure side rails 140 through the top of seamed shipping carton 300 or fold over carton 350. Thus, is hood 110, even in a smaller version, secured appropriately for transport.

While it is not desired to be bound by any particular theory, the following postulate is offered for the success of this package assembly 100. Seamed shipping carton 300 or fold over carton 350 support the side rails 140 with the swing brace panels 142, and the corrugated rear inserts 164 and the corrugated front inserts 190 work together. Either the seamed shipping carton 300 or the fold over carton 350 renders the part such as hood 110 contained therein at least substantially immovable relative to the packing assembly 120. Then the blows to package 100 are absorbed thereby without damage to the part contained therein.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A protective package for shipping a part comprising:
(a) a carton having a packing assembly therein;
(b) the packing assembly including a first side rail support and a second side rail support adapted to position the part in the carton;
(c) the packing assembly including a first rear support in the first side rail in the carton to support a rear portion of the part;
(d) the packing assembly including a second rear support in the second side rail in the carton to support the rear portion of the part;
(e) the packing assembly including a first front support in the front side rail in the carton to support a front portion of the part;
(f) the packing assembly including a second front support in the second side rail in the carton to support the front portion of the part;
(g) a first slot being present in the first side rail support;
(h) a second slot being present in the second side rail support;
(i) the first slot receiving the first rear support and the first front support;
(j) the second slot receiving the second rear support and the second front support;
(k) a first spacer pad being inserted between the carton and the first side rail;
(l) a second spacer pad being inserted between the carton and the second side rail;
(m) the first spacer pad, the second spacer pad, the first rear support, the first front support, the second rear support and the second front support cooperating to support the part within the carton and at least minimize damage to the part;
(n) the first spacer pad forcing the first side rail inwardly to provide additional support for the part;
(o) the second spacer pad forcing the second side rail inwardly to provide additional support for the part;
(p) the first spacer pad and the second spacer pad forming part of the packing assembly;
(q) the first front support and the second front support being substantially similar in appearance;
(r) the first front support being formed from a corrugated front insert die-cut flat with a front foam support mounted therein;
(s) the front foam support having a front jaw slot; and
(t) the front jaw slot being adapted to receive and partially support the part.

2. The protective package of claim 1 further comprising:
(a) the first rear support and the second rear support being substantially similar in appearance;
(b) the first rear support being formed from a corrugated rear insert die-cut flat with a rear foam support mounted therein;
(c) the rear foam support having a rear jaw slot; and
(d) the rear jaw slot being adapted to receive and partially support the part.

3. The protective package of claim 1 further comprising:
(a) the first side rail and the second side rail being substantially similar in appearance;
(b) the first side rail being formed from a scored flat corrugated piece of material;
(c) the first side rail having an inner side and an outer side;
(d) a large top panel joining the inner side and the outer side;
(e) the large top panel extending into a larger inner panel;
(f) the larger inner panel forming a first part of the inner side;
(g) the larger inner panel being substantially parallel to the outer side;
(h) the larger inner panel extending into a first slot side and then into a second base side;
(i) a small bottom panel extending from the outer side in a substantially perpendicular relationship;
(j) the small bottom panel then forming a smaller inner panel;
(k) smaller inner panel extending into a second slot side;
(l) the second slot side extending into a first slot base in order to form the rail channel slot with second base side; and
(m) the rail channel slot thus formed receiving the part.

4. The protective package of claim 3 further comprising:
(a) the first rear support and the second rear support being substantially similar in appearance;
(b) the first rear support being formed from a corrugated rear insert die-cut flat with a rear foam support mounted therein;
(c) the rear foam support having a rear jaw slot; and
(d) the rear jaw slot being adapted to partially receive and partially inset the part.

5. The protective package of claim 4 further comprising:
(a) the outer side including a large top swing brace panel and a smaller top swing brace panel scored in the outer side;
(b) the large top swing brace panel forming a large top brace support as substantially perpendicular to the large top panel; and
(c) the smaller top swing brace forming a smaller top brace support as substantially perpendicular to the large top panel.

6. The protective package of claim 5 further comprising:
(a) the shipping carton being a seamed shipping carton or a fold over carton;
(b) the large top brace support forming a larger top rest lip;
(c) the smaller top swing brace forming a smaller top rest lip; and (d) the smaller top swing brace panel being spaced apart from the large top swing brace panel in order to support the side rail.

7. A method of forming a protective package for shipping a part comprising:

(a) providing a shipping carton with a generally rectangular shape for the protective package;

(b) shaping the carton with rear dust flaps mounted thereon;

(c) shaping a first side rail to have a first part receiving slot and a second side rail to have a second part receiving slot;

(d) fitting the first side rail and the second side rail into the carton on opposing sides thereof;

(e) spacing the first side rail and the second side rail from the respective opposing sides of the carton with a side spacer;

*(f) forming a first front insert from a corrugated front insert die-cut flat;*

*(g) folding a rear die-cut flat to form a first rear insert;*

*(h) placing a front foam support in the first front insert;*

*(i) inserting a larger jaw angle cut spacer into the first rear insert;*

*(j) inserting a foldable tongue from the rear die-cut flat into the larger jaw angle cut spacer;*

*(k) having a second front insert being similar in shape to the first front insert;*

*(l) having a second rear insert being similar in shape to the first rear insert;*

([f]*m*) placing [a] *the* first rear insert in the first side rail;

([g]*n*) placing [a] *the* second rear insert in the second side rail;

([h]*o*) inserting the part into the carton in contact with the first side rail, the second side rail into the first rear insert and the second rear insert;

([i]*p*) placing [a] *the* first front insert in the first side rail and in contact with the part;

([j]*q*) placing [a] *the* second front insert in the second side rail and in contact with the part; *and*

([k]*r*) closing the carton[;

(l) having the first rear insert being similar in shape the second rear insert;

(m) folding a rear die-cut flat to form the first rear insert;

(n) inserting a larger jaw angle cut spacer into the first rear insert;

(o) inserting a foldable tongue from the rear die-cut flat into the larger jaw angle cut spacer;

(p) having the first front insert being similar in shape to the second front insert;

(q) forming the first front insert from a corrugated front insert die-cut flat; and (r) placing a front foam support in the first front insert].

8. The method of claim 7 further comprising:

(a) folding [a pair of] *the* rear dust flaps for the carton inwardly in order to hold the carton in a proper position for packing; *and*

(b) folding a rear bottom flap over [pair of] *the* rear dust flaps[;

(c) inserting the first side rail and the second side rail into the carton;

(d) inserting the part into the shipping carton; and (e) closing the carton].

9. The method of claim 8 further comprising:

(a) inserting a first spacer pad between the carton and the first side rail to push in the first side rail;

(b) inserting a second spacer pad between the shipping carton and the second side rail to push in the second side rail;

(c) providing a rear closable end oppositely disposed from a front closable end for the carton;

(d) having a rail channel slot in the first side rail and second side rail to receive the part; and (e) supporting the part in the rail channel slot.

10. A protective package for shipping a part comprising:

a carton having a packing assembly therein;

the packing assembly including a first side rail support and a second side rail support adapted to position the part in the carton;

the packing assembly including a first rear support in the first side rail in the carton to support a rear portion of the part;

the packing assembly including a second rear support in the second side rail in the carton to support the rear portion of the part;

the carton being a seamed carton or a fold over carton;

the packing assembly including a first front support in the [second] *first* side rail in the carton to support a front portion of the part;

the packing assembly including a second front support in the second side rail in the carton to support the front portion of the part;

a first slot being present in the first side rail support;

a second slot being present in the second side rail support;

the first slot receiving the first rear support and the first front support;

the second slot receiving the second rear support and the second front support;

a first spacer pad being inserted between the carton and the first side rail;

a second spacer pad being inserted between the carton and the second side rail;

the first spacer pad, the second spacer pad, the first rear support, the first front support, the second rear support and the second front support cooperating to support the part within the carton and at least minimize damage to the part;

the first spacer pad forcing the first side rail inwardly to provide additional support for the part;

the second spacer pad forcing the second side rail inwardly to provide additional support for the part;

the first spacer pad and the second spacer pad forming part of the packing assembly;

the first front support and the second front support being substantially similar in appearance;

the first front support being formed from a corrugated front insert die-cut flat with a front foam support mounted therein;

the front foam support having a front jaw slot; and the front jaw slot being adapted to receive and partially support the part.

*11. A hood packing assembly, comprising:*

*a carton having a first wall and a second wall;*

*a first sidewall within the carton having a first upper panel and a first lower panel, wherein a first rail channel slot is formed between the first upper panel and the first lower panel, and the first rail channel slot is located a greater distance from the first wall than the second wall of the carton;*

*a second sidewall within the carton, separate and apart from the first sidewall, having a second upper panel and a second lower panel, wherein a second rail channel slot is formed between the second upper panel and the sec-*

*ond lower panel, and the first rail channel slot faces the second rail channel slot, and the second rail channel slot is located a greater distance from the first wall than the second wall of the carton;*

*a first rail channel slot spacer and a second rail channel slot spacer located within the first rail channel slot;*

*a third rail channel slot spacer and a fourth rail channel slot spacer located within the second rail channel slot;*

*said first, second, third and fourth rail channel slot spacers each include a slot for receiving a portion of an edge of an automobile hood; and*

*said slots in the first and second rail channel slot spacers face each other, and said slots in the third and fourth rail channel slot spacers face each other.*

*12. The hood packing assembly of claim 11, further comprising:*

*an automobile hood located within the carton, wherein at least a portion of a first edge of the automobile hood is located within the first rail channel slot, and wherein at least a portion of a second edge of the automobile hood is located within the second rail channel slot.*

*13. The hood packing assembly of claim 11, further comprising:*

*an automobile hood located within the carton, wherein at least a portion of a first edge of the automobile hood is located within the first rail channel slot and between the first and second rail channel slot spacers and wherein at least a portion of a second edge of the automobile hood is located within the second rail channel slot and between the third and fourth rail channel slot spacers.*

*14. The hood packing assembly of claim 11, wherein the first rail channel slot and the second rail channel slot are aligned to be at a similar height within the carton.*

*15. The hood packing assembly of claim 11, wherein the first lower panel, the first upper panel, the second lower panel, and the second upper panel are formed by folded corrugated cardboard.*

*16. The hood pack packing assembly of claim 11, wherein the first, second, third, and fourth rail channel slot spacers are constructed of compressible material.*

*17. The hood pack packing assembly of claim 16, wherein the compressible material includes foam.*

*18. The hood packing assembly of claim 11, wherein the first sidewall, the first upper panel, the first lower panel, and the first rail channel slot are formed from a first single sheet of corrugated cardboard, and wherein the second sidewall, the second upper panel, the second lower panel, and the second rail channel slot are formed from a second single sheet of corrugated cardboard.*

*19. The hood packing assembly of claim 11, wherein the first and second rail channel slot spacers are positioned proximate opposing ends of the first rail channel slot, and the third and fourth rail channel slot spacers are positioned proximate opposing ends of the second rail channel slot.*

*20. The hood packing assembly of claim 11, wherein the first and second sidewalls are constructed separately from walls of the carton, and further comprising:*

*a first sidewall spacer located between the first sidewall and the carton; and*

*a second sidewall spacer located between the second sidewall and the carton.*

*21. The hood packing assembly of claim 20, wherein the first and second sidewall spacers are constructed of compressible material.*

*22. The hood packing assembly of claim 21, wherein the compressible material of the first and second sidewall spacers includes foam.*

*23. The hood packing assembly of claim 11, further comprising:*

*a separate foldable tongue located in each of the slots in the first, second, third and fourth rail channel slot spacers.*

*24. A protective package, comprising:*

*a carton having a first wall and a second wall;*

*a packing assembly within the carton, comprising;*

*a first side rail having a first rail channel slot;*

*a second side rail, separate and apart from the first side rail, having a second side rail channel slot substantially parallel to the first rail channel slot, and the first and second rail channel slots are located a greater distance from the first wall than the second wall of the carton;*

*a first rail channel slot spacer and a second rail channel slot spacer constructed of compressible material and positioned within the first rail channel slot, wherein the first and second rail channel slot spacers are located proximate opposing ends of the first rail channel slot; and*

*a third rail channel slot spacer and a fourth rail channel slot spacer constructed of compressible material and positioned within the second rail channel slot, wherein the third and fourth rail channel slot spacers are located proximate opposing ends of the second rail channel slot;*

*said first, second, third and fourth rail channel slot spacers each include a slot for receiving a portion of an edge of an automobile hood; and*

*said slots in the first and second rail channel slot spacers face each other, and said slots in the third and fourth rail channel slot spacers face each other.*

*25. The protective package of claim 24, wherein the compressible material is foam.*

*26. The hood packing assembly of claim 11, wherein the first and second sidewalls and the first and second rails channel slots formed therein extend the substantial length of the carton within which the first and second sidewall are contained.*

*27. The hood packing assembly of claim 11, wherein the widths of the first, second, third and fourth rail channel slot spacers are substantially similar to the depths of the first and second rail channel slots.*

*28. The hood packing assembly of claim 11, wherein the first and second sidewalls are positioned at opposing sides of the carton.*

* * * * *